United States Patent [19]

Gold

[11] 4,445,768

[45] May 1, 1984

[54] PHOTOGRAPHIC FILM ASSEMBLAGE WITH IMPROVED LEADER

[75] Inventor: Nicholas Gold, Arlington, Mass.

[73] Assignee: Polaroid Corporation, Cambridge, Mass.

[21] Appl. No.: 388,421

[22] Filed: Jun. 14, 1982

[51] Int. Cl.³ .............................................. G03B 17/26
[52] U.S. Cl. .................................... 354/275; 430/501
[58] Field of Search ................ 354/275; 352/235, 241; 430/500, 501

[56] References Cited

U.S. PATENT DOCUMENTS

| | | | |
|---|---|---|---|
| 2,541,476 | 2/1951 | Mihalyi | 242/71 |
| 3,433,637 | 3/1969 | Bachelder | 96/78 |
| 3,613,876 | 10/1971 | Kohler et al. | 206/52 F |
| 3,690,451 | 9/1972 | Nerwin | 206/52 F |
| 4,295,713 | 10/1981 | Edwards | 352/235 |

*Primary Examiner*—John Gonzales
*Attorney, Agent, or Firm*—Alfred E. Corrigan

[57] ABSTRACT

A photographic film assemblage including a film spool about which is wound a length of resilient material including a strip of photographic film and an opaque leader. The opaque leader is provided along its sides with a series of integral tabs which are adapted to be displaced from the plane of the leader by a film metering sprocket of a camera during movement of the film. The resiliency of the tabs results in those located in the ultimate convolution of the roll of material being displaced from the curved plane of the ultimate convolution thereby leaving voids or apertures therein. When the tabs appear in both the ultimate and penultimate convolutions of the roll, some of the tabs in the penultimate convolution enter the apertures in the ultimate convolution thereby deterring clockspringing of the roll. When the tabs are located in the plane of the leader, they function to substantially prevent the passage of light to underlying convolutions of film.

2 Claims, 5 Drawing Figures

PHOTOGRAPHIC FILM ASSEMBLAGE WITH IMPROVED LEADER

BACKGROUND OF THE INVENTION

1. Field of the Invention

The invention relates to an improved leader construction for a photographic film assemblage.

2. Description of the Prior Art

The present invention relates to a photographic film assemblage, preferably of the 35 mm type, and more particularly to such an assemblage which includes an improved leader construction. Generally, film assemblages of this type include a roll of material which is mounted on a spool. The roll of material includes a length of photographic film having a trailing end secured to the spool and a leading end which functions as a leader and is adapted to be attached to a film take-up reel, as described in U.S. Pat. No. 3,690,451. Alternatively, the leading end of the film may be attached to the trailing end of an opaque leader, as described in U.S. Pat. No. 4,295,713. In either case, generally the longitudinally extending opposite sides of the leader and the film are provided with a series of apertures which are adapted to coact with the cogs of a sprocket wheel in a camera to insure that a predetermined length of film and/or leader is withdrawn from the spool during each actuation of the camera's film advance lever.

In film assemblages of the type wherein the leader is opaque and defines at least the ultimate (outermost) convolution and the penultimate (next outermost) convolution of the roll, the aforementioned apertures create light leak problems insofar as it is possible for ambient light to pass through these apertures when they are partially or fully aligned with superposed apertures and fog the underlying film. This problem is especially critical where the spool containing the roll of film and leader is not mounted within a lighttight cassette or housing.

Still another problem with film assemblages of the type described is a phenomenon called clockspringing of the roll of material, i.e., the inherent tendency for the roll to expand as it tries to uncoil. As is well known in the art, such expansion may cause the ultimate or outermost convolution of the roll to move into intimate contact with adjacent surfaces of its housing thereby increasing the forces needed for a film advancing mechanism of a camera to withdraw the film and/or leader from its housing.

Several means have been employed to obviate the disadvantages of clockspringing. For example, the aforementioned U.S. Pat. No. 3,690,451 shows a film leader which has been transversely corrugated such that it makes firm engagement with the surrounding surfaces of its housing. As the film ages, the inherent plasticity causes the effects of clockspringing to diminish as its corrugations relax. U.S. Pat. No. 3,613,876 employs a method wherein a film spool is spot welded to its supporting structure. The welds have sufficient strength to prevent relative rotation therebetween during shipment of the film assemblage, but will break as the film is withdrawn from the spool. Still another method is described in U.S. Pat. No. 3,433,637. In this patent, a roll of film has at least one forwardly directed tab in an inner convolution which is adapted to enter an aperture in the next outermost convolution so as to lock the two convolutions together.

The disadvantages of the aforementioned patent are fairly obvious to those skilled in the art. For example, corrugating the film leader as in U.S. Pat. No. 3,690,451 results in (1) a needless waste of photographic film, (2) a reduction in the amount of usable film which can be housed within the film container due to the increased thickness of the corrugated leader, and (3) the added cost involved in corrugating the film leader. As regard U.S. Pat. No. 3,613,876, the added costs related to the spot welding operation and the attendant tolerances of the welds weigh against its possible adoption as a solution to the problem. The method employed in U.S. Pat. No. 3,433,637 not only entails a separate manufacturing step but also needlessly wastes film.

SUMMARY OF THE INVENTION

The instant invention relates to a photographic film assemblage of the type adapted for use in handheld cameras, preferably of the 35 mm type, and more particularly to an improved construction for an opaque leader.

The photographic film assemblage includes a spool having a pair of longitudinally or axially spaced, radially extending collars, each of which has an annular flange extending at a right angle to the surface of its respective collar and toward the annular flange on the other collar. The spool is adapted to support a roll of material between the collars. The roll of material includes a length of photographic film having a trailing end secured to the spool and a leading end to which is secured the trailing end of an opaque leader. The opaque leader extends from its attachment to the film for at least two convolutions before terminating in a leading end which is adapted to be attached to a film take-up reel or roller of a camera. The roll of material is wound about the body of the spool such that the opposite edges of the roll are confined between, and located closely adjacent to, the inwardly facing surfaces of the collars, and the annular flanges overlie the lateral sides of the outermost or ultimate convolution of the roll so as to limit its maximum diameter. The free end of the opaque leader is configured (tapered) so as not to be confined by the annular flanges.

The film assemblage further includes a housing which is adapted to enclose and rotatably support the spool. The housing has a withdrawal opening or passage through which the leader and the film is adapted to be withdrawn. The width of the passageway is slightly less than the maximum width of the leader and of the film thus resulting in the major length of the leader and the film being bowed as it is being withdrawn or uncoiled from, or being rewound upon the spool, thereby facilitating the movement of the edges of the film and the major portion of the leader under the annular flanges. The passageway is unobstructed thus permitting easy movement of the free end of the leader therethrough and the entry of ambient light into the interior of the housing. However, the film is protected from exposure by ambient light by (1) the opaque leader which defines at least the outermost two convolutions of the roll wound upon the film spool, (2) the collars, and (3) the annular flanges. The passageway is configured such that one merely has to rotate the film spool in a predetermined direction relative to the housing in order to move the free or leading end of the opaque leader into and through the passageway so that it may be manually grasped and connected to a film advancing mechanism of a camera or film processor.

The opaque leader is formed from any material which is compatible with the film, e.g., Tedlar, and has a length sufficient to define at least the outermost two convolutions of the roll. The leading end of the opaque leader includes a plurality of conventional rectangularly shaped apertures commonly found in film adapted for use in 35 mm cameras. These commonly shaped apertures are shortly replaced by a series of forwardly facing integral tabs running along each side of the leader. Each of the tabs is formed by punching a U-shaped slit in the opaque leader. Generally, when the leader is in a flat plane, the tabs form a continuation of the surrounding portions of the leader and are movable out of said plane by the cogs of a sprocket wheel of a camera during movement of the film. However, when the portion of the leader in which they are located is in a curved plane, such as a convolution of the roll, and if they are not physically restrained, their resiliency causes them to extend out of said curved plane thereby leaving in their places correspondingly shaped apertures in the leader. Accordingly, when the tabs appear in the ultimate and penultimate convolutions in the roll, the tabs in the ultimate convolution extend away from the curved plane containing such ultimate convolution while those in the penultimate convolution are maintained in its plane by overlying portions of the ultimate convolution. As the resiliency of the coiled roll starts to cause it to clockspring thereby moving the ultimate convolution relative to the penultimate convolution, at least one of the tabs in the penultimate convolution is moved into direct alignment with a correspondingly shaped aperture in the ultimate convolution. When this alignment occurs, the tab snaps into the aperture thereby locking the two convolutions against further movement in a direction which would increase the adverse affects of clockspringing.

It is an object of the invention to provide an improved leader construction for a photographic film assemblage, which leader includes closable film metering apertures.

Another object of the invention is to provide a photographic film assemblage with an improved opaque leader construction which provides a light barrier for a roll of film, deters clockspringing of the film, and assists in the metering of the film during advancement thereof in a camera.

Other objects of the invention will in part be obvious and will in part appear hereinafter.

The invention accordingly comprises the photographic film assemblage possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
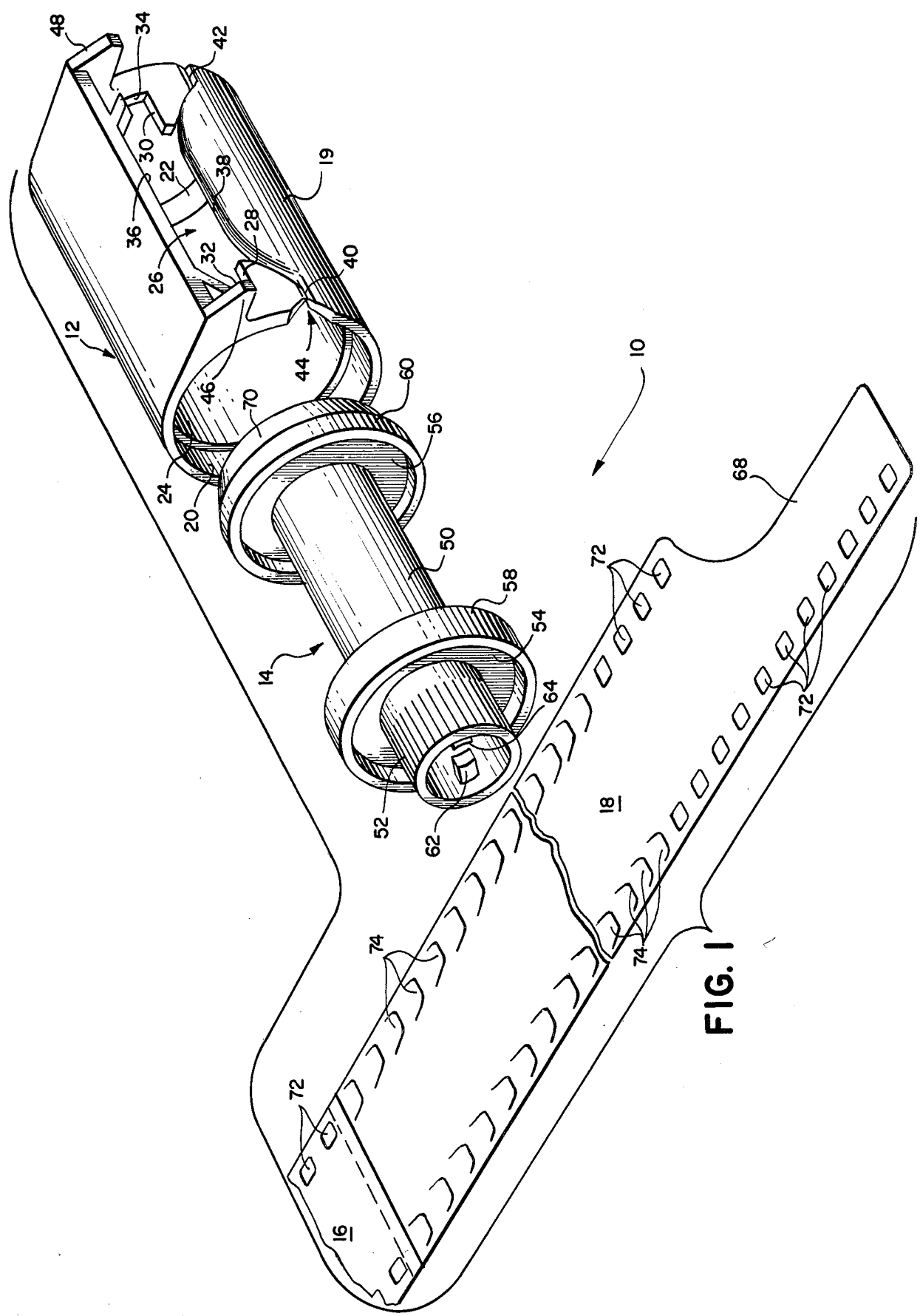
FIG. 1 is an enlarged, exploded perspective view of a photographic film assemblage which incorporates the instant invention.

Reference is now made to the drawings wherein is shown a photographic film assemblage 10 including a housing 12 which may or may not be opaque, a hollow film spool 14 and a leading end of a length of photographic film 16 having a trailing end of an opaque leader 18 attached thereto.

The housing 12 has a generally cylindrically configured wall 19 which is adapted to be received by conventional 35 mm cameras. The interior surface of the wall 19 is recessed at 20 and 22 so as to define the ends of an intermediate wall portion 24 of increased thickness. A film withdrawal slot or passageway 26 is located in the wall 19 and is defined in part by a pair of laterally spaced, horizontally extending surfaces 28 and 30, a vertical surface 32 and 34 extending upwardly from the surfaces 28 and 30, respectively, a generally planar upper surface 36, and a gently curved lower surface 38. The opposite ends of the lower surface 38 are terminated by horizontal shoulders 40 and 42. The shoulder 40 extends into a V-shaped slot 44 while the shoulder 42 extends to the righthand end (as viewed in FIG. 1) of the housing 12. Thus, the housing 12, which may be molded from any suitable material such as ABS (acrylonitrile-butadiene-styrene) is split longitudinally by the V-shaped slot 44, the shoulders 40 and 42 and the passageway 26 such that its diameter may be temporarily enlarged during assembly of the film assemblage 10. A pair of protrusions 46 and 48 extend forwardly from the opposite ends of the surface 36 and function to engage fixed camera structure so as to properly position the film assemblage 10 during loading thereof into a camera and to prevent its rotation during the withdrawal of the film 16 and the leader 18.

The film spool 14, which is opaque, and may be molded from ABS, includes a cylindrically configured spindle 50 having a serrated end 52 and a pair of longitudinally spaced annular collars 54 and 56 which are integral therewith and which extend radially therefrom. An annular flange 58 extends inwardly from the periphery of the collar 54 so as to receive the lefthand end of the roll of material which includes the film 16 and the leader 18, and a similar flange 60 extends from the periphery of the collar 56 toward the flange 58 so as to receive the righthand end of the roll. So structured, the flanges 58 and 60 function to (1) limit the maximum diameter of the roll of material 16, (2) keep the film 16 from engaging and being scratched by the interior surface of the housing 12, and (3) prevent the passage of light between the facing surfaces of the collars 54 and 56 and the opposite edges of the roll of material. A pair of drive surfaces or tabs 62 and 64 extend inwardly towards each other inside of the left end of the spindle 50 while a tab 66 (see FIG. 2) extends across the opposite end of the spindle 50. The tabs 62 and 64 and the tab 66 are adapted to be engaged by a camera or a film processor mechanism for winding the film 16 and leader 18 upon the film spool 14.

The film 16 includes a trailing end (not shown) which is attached to the spindle 50, and the opaque leader 18 includes a tapered leading end 68 which is adapted to be attached to a film advance mechanism of a camera or film processor. The trailing end of the opaque leader 18 is secured to the non-emulsion side of the film 16 and, preferably, has a length sufficient to define at least the outermost two convolutions of the roll of material. The width of the opaque leader 18, except for its end 68, is substantially equal to the width of the film 16. The width of the film 16 is substantially equal to the spacing between the facing surfaces of the collars 54 and 56. Further, the width of the film 16 is greater than the distance between the facing surfaces of the flanges 58 and 60 which, in turn, is greater than the width of the passageway 26 as measured between the vertical surfaces 32 and 34. In one prototype constructed in accordance with the instant invention, the width of the film 16 was 34.97 mm, the distance between the facing surfaces of the collars 54 and 56 was 35.20 mm, the distance between the facing surfaces of the annular flanges 58 and 60 was 34.20 mm, and the width of the passageway 26 was 34.04 mm.

Figure 2:
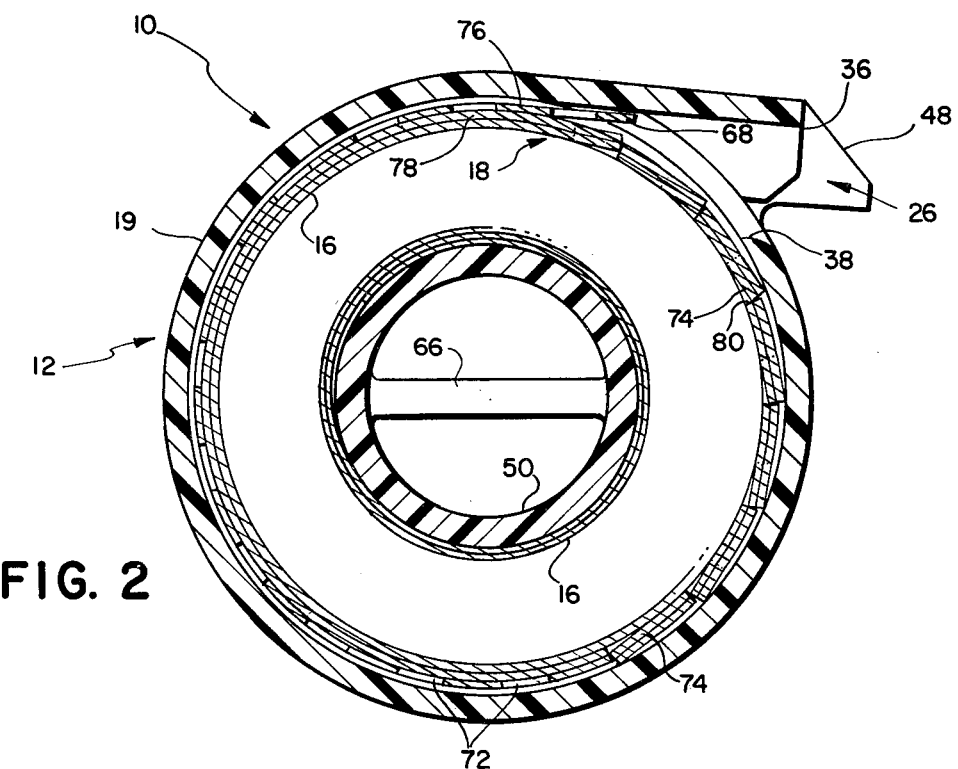
FIG. 2 is an enlarged cross-sectional view, partly in section, of the film assemblage of FIG. 1, shown in its assembled state with only some of the convolutions of a roll of material being shown for reasons of clarity.
Figure 3:
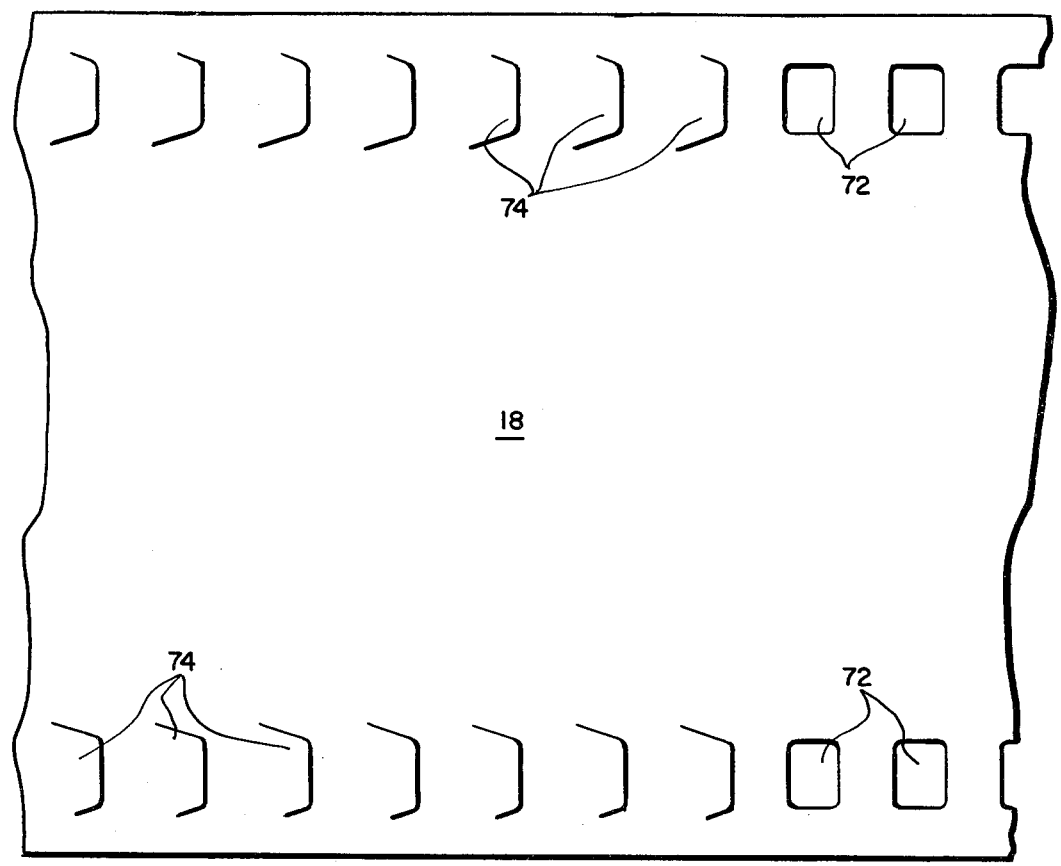
FIG. 3 is an enlarged plan view of a section of the opaque leader.

As best shown in FIG. 1, the leading end 68 of the opaque leader 18 is provided along one side with a plurality of rectangularly-shaped sprocket holes or apertures 72. As the width of the leader 18 increases, additional apertures are located on the opposite longitudinal side of the leader 18. These apertures 72 in the leader 18 cooperate with a sprocket wheel in a camera to meter the initial movement of the leader 18 and the film 18 from the housing 12. The apertures 72 are shortly replaced by a series of V-shaped cutout sections, each of which defines an integral, forwardly extending tapered tab 74. The tabs 74 normally lie in the plane of the surrounding leader material (Tedlar) when the leader 18 is flat, thereby substantially preventing passage of light through that portion of the opaque leader 18. However, when the plane of the leader 18 is curved, such as when it defines the outer or ultimate convolution 76 or the inner or penultimate convolution 78 in the roll, the plastic memory of the tabs causes them to maintain their flatness. Accordingly, as best seen in FIG. 2, the tabs 74, which are spaced slightly inwardly of the flanges 58 and 60, are located outside of the curved plane of the ultimate convolution 76 thereby leaving apertures 80 in their plane, while the majority of the tabs 74 in the penultimate convolution 78 are held in its curved plane by the overlying ultimate convolution 76 thereby preserving the lighttightness of the penultimate convolution.

Figure 2A:
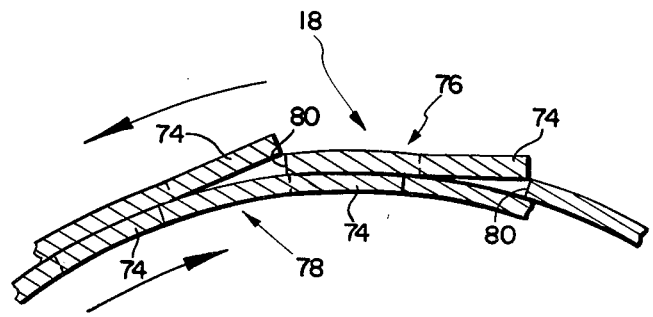
FIGS. 2a and 2b are enlarged sectional views showing the functional relationship between the ultimate and penultimate convolutions of an opaque film leader.
Figure 2B:
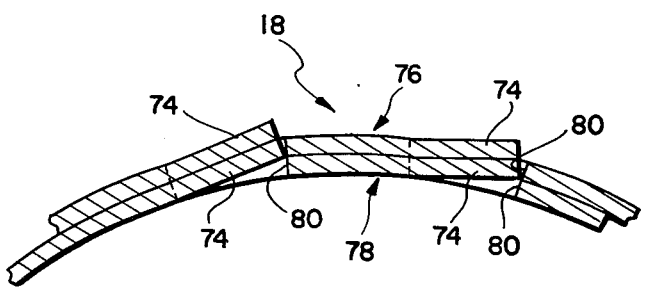

As the roll of material comprised of the film 16 and the opaque leader starts to clockspring, the ultimate convolution 76 and the penultimate convolution 78 move in the direction of the arrows shown in FIG. 2a until a tab 74 in the penultimate convolution 78 is located in direct alignment with a correspondingly shaped aperture 80. When this alignment occurs, the resiliency of the tab 74 in the penultimate convolution 78 cause it to move into the aligned aperture 80, as depicted in FIG. 2b, thereby preventing any further clockspringing.

During assembly of the film assemblage 10 a strip of adhesive tape is folded in two such that the spindle 50 is secured in the bight of the fold and the remaining facing surfaces of the strip are adhered to each other except for the two end portions which are left spaced apart, much like the arms of the letter "Y". The film spool 14 is then moved into the end of the housing 12 having the recessed portion 20. During such movement a chamfered portion 70 of the collar 56 engages the lefthand end of the housing 12 and spreads it to a diameter which permits entry of the film spool 14 into the housing 12. Also, during such movement, the vertical leg of the aforementioned "Y" is passed through the V-shaped groove 44 in the wall 19 of the housing 12. Immediately after the collar 56 passes the righthand edge of the intermediate section 24 of the housing 12, the resiliency of the housing 12 causes it to snap back into its original position thereby capturing the film spool 14. Next, the trailing end of a length of material including the unexposed film 16 and the attached leader 18 is placed between the arms of the "Y" configured adhesive material and the arms then moved into contact with the film 16 thereby securing the latter to the film spool 14. The film spool 14 is then driven in a counterclockwise manner until the film 16 plus the leader 18 are wound upon the spool 14. During such winding, the reduced width of the slot 26 relative to the width of the film 16 and leader 18 bows the film and leader laterally, i.e., from side-to-side, thereby easing it between and under the inwardly facing flanges 58 and 60 where it resumes its substantially flat (widthwise) condition. As mentioned hereinbefore, the leading end 68 of the leader 18 is slightly tapered, longitudinally, such that it is not constrained by the annular flanges 58 and 60. Accordingly, the only restraint on the leading end of the leader 18 trying to move away from the roll of material is the interior surface of the housing 12. The film assemblage 10 may then be hermetically packaged for shipment to a retail outlet.

After the film assemblage 10 has been removed from its package, it may be allowed to sit in the ambient light for a period of time without fear that the film 16 will be fogged, despite the fact that the ambient light is free to enter the housing 12 via the passageway 26. This is because the opaque leader 18 prevents the passage of ambient light to the convolutions of film. Further, the annular flanges 58 and 60 prevent the ambient light from passing between the facing surfaces of the annular collars 54 and 56 and the sides of the roll of material while the collars 54 and 56 prevent ambient light from entering the opposite ends of the housing 12 and directly striking the sides of the roll.

When it is desired to load the film assemblage into a camera for exposure of the film 16, or into a processor for processing exposed film, one merely rotates the film spool 14 relative to the housing 12 in order to gain access to the leading end 68 of the leader 18. Specifically, one merely holds the housing 12 in one hand and rotates the film spool 14 via the serrated end 52 with the other hand in a clockwise direction, as viewed in FIG. 2, until the leading end 68 emerges from within the housing 12. Stated another way, as the film spool 14 is rotated in a clockwise direction, the leading end 68, regardless of its original position within the housing 12, eventually approaches the passageway 26 where it is no longer constrained by the curved interior surface of the housing 12 to move in a circular path. To the contrary, the only restraint now on the leading end 68 of the film is the relative straight interior surface of the planar upper surface 36. Since the normal tendency of the leading end 68 of the leader 18 is to unwind itself, i.e., move away from the rest of the roll, it follows the surface 36 until it exits from the passageway 26. As the leader 18 and the film 16 are being unwound from the film spool 14, they are slightly bowed by the annular flanges 58 and 60. They are further bowed by the constraints put on its edges by the juncture between the horizontal and vertical surfaces 28 and 32 on one side of the passageway 26 and the horizontal and vertical surfaces 30 and 34, respectively, on the opposite side of the passageway 26. Thus constrained, the only portions of the film 16 which contact the housing 12 are its lateral edges. The leader 18 and the film 16 return to their normal flat condition shortly after moving out of engagement with the housing 12.

Since certain changes may be made in the above-described photographic film assemblage without departing from the scope of the invention herein involved, it is intended that all matter contained in the above description or shown in the accompanying drawings shall be interpreted as illustrative and not in a limiting sense. For example, the film assemblage 10 need not include the housing 12 since the opaque leader 18 can be taped in place to preserve the lighttightness of the assemblage.

What is claimed is:

1. A photographic film assemblage comprising:
    a housing for rotatably supporting a film spool having a length of photographic film coiled thereabout, said housing including means defining an opening through which the film may be advanced to the exterior of said housing;
    a film spool rotatably mounted within said housing;
    a length of unexposed photographic film coiled about said film spool, said film having trailing and leading ends; and
    an opaque leader formed from a resilient material, said opaque leader having a trailing end secured to said leading end of said film, said leader extending from said leading end of said film and defining at least an inner convolution and an outer convolution about said coiled film, said leader including means defining a series of integral tabs in said inner and outer convolutions of said leader, said tabs in said inner convolution of said leader being substantially maintained in the plane of said inner convolution by said outer convolution of said leader thereby substantially preventing the passage of light through said inner convolution, said tabs being adapted for sequential movement out of the plane of said leader by an apparatus of a camera thereby leaving apertures in said leader for accommodating the apparatus, said tabs being tapered in the direction in which said leader is adapted to be uncoiled from said film spool such that when said tapered tabs in said outer convolution are located slightly out of the plane of said outer convolution thereby leaving tapered apertures in said outer convolution, at least one of said tapered tabs in said inner convolution may enter one of said tapered apertures in said outer convolution thereby deterring clockspringing of said leader and said film.

2. A photographic film assemblage comprising:
    a film spool including a pair of spaced collars extending radially from a rotational axis of said spool, each of said collars including an annular flange which extends inwardly toward the annular flange on the other collar;
    a roll of material including a length of unexposed photographic film and an attached opaque leader mounted upon said film spool with said leader defining at least the ultimate and penultimate convolutions of said roll, said roll of material including opposite sides which are located closely adjacent to and between said collars wtih said flanges overlaying the edges of said ultimate convolution; and
    said leader includes means defining a series of integral tabs in said ultimate and penultimate convolutions, said tabs in said penultimate convolution being substantially maintained in the plane of said penultimate convolution by said ultimate convolution thereby substantially preventing the passage of light through said penultimate convolution, said tabs being adapted for sequential movement out of the plane of said leader by an apparatus of a camera thereby leaving apertures in said leader for accommodating the apparatus, said tabs being tapered in the direction in which said leader is adapted to be uncoiled from said film spool such that when said tapered tabs in said ultimate convolution are located slightly out of the plane of said ultimate convolution thereby leaving tapered apertures in said ultimate convolution, at least one of said tapered tabs in said penultimate convolution may enter one of said tapered apertures in said ultimate convolution thereby deterring clockspringing of said roll.

* * * * *